US011230130B2

(12) United States Patent
Tanaka (10) Patent No.: US 11,230,130 B2
(45) Date of Patent: Jan. 25, 2022

(54) MATERIAL COMPOSITION FOR PRESSURE MEASUREMENT, MATERIAL FOR PRESSURE MEASUREMENT, AND MATERIAL SET FOR PRESSURE MEASUREMENT

(71) Applicant: FUJIFILM CORPORATION, Tokyo (JP)

(72) Inventor: Satoshi Tanaka, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 349 days.

(21) Appl. No.: 16/364,189

(22) Filed: Mar. 26, 2019

(65) Prior Publication Data
US 2019/0219464 A1 Jul. 18, 2019

Related U.S. Application Data

(63) Continuation of application No. PCT/JP2017/034219, filed on Sep. 22, 2017.

(30) Foreign Application Priority Data

Jun. 2, 2017 (JP) .............................. JP2017-110220

(51) Int. Cl.
*B41M 5/165* (2006.01)
*B41M 5/155* (2006.01)
(Continued)

(52) U.S. Cl.
CPC ............ *B41M 5/1655* (2013.01); *B01J 13/02* (2013.01); *B41M 5/155* (2013.01); *B41M 5/165* (2013.01); *G01L 1/247* (2013.01)

(58) Field of Classification Search
CPC . B41M 5/165; B41M 5/1655; C09B 67/0097; G01L 1/247
See application file for complete search history.

(56) References Cited

U.S. PATENT DOCUMENTS 3,617,334 A 11/1971 Brockett et al.
3,647,504 A 3/1972 Hayes, Jr. et al.
(Continued)

FOREIGN PATENT DOCUMENTS

| CN | 101743461 A | 6/2010 |
| CN | 102448732 A | 5/2012 |

(Continued)

OTHER PUBLICATIONS

Office Action dated Jan. 28, 2020 issued by the JPO in corresponding Japanese Patent Application No. 2020-004514.
(Continued)

*Primary Examiner* — Daniel J Colilla
(74) *Attorney, Agent, or Firm* — Solaris Intellectual Property Group, PLLC (57) ABSTRACT

Provided are a material for pressure measurement, including a color forming layer that contains microcapsules A encapsulating an electron-donating colorless dye precursor and microcapsules B not encapsulating an electron-donating colorless dye precursor, in which a volume standard median diameter D50A of the microcapsules A and a volume standard median diameter D50B of the microcapsules B satisfy Equation 1; a material composition for pressure measurement; and a material set for pressure measurement:

$$D50A < D50B \qquad \text{Equation 1.}$$

19 Claims, 1 Drawing Sheet

(51) Int. Cl.
  *G01L 1/24*     (2006.01)
  *B01J 13/02*    (2006.01)

(56) References Cited

U.S. PATENT DOCUMENTS

| | | | | |
|---|---|---|---|---|
| 3,738,857 A | * | 6/1973 | Brockett et al. | ....... B41M 5/165 |
| | | | | 503/207 |
| 4,002,060 A | | 1/1977 | Ogata et al. | |
| 4,104,910 A | | 8/1978 | Ogata et al. | |
| 4,842,976 A | | 6/1989 | Sanders et al. | |
| 4,977,131 A | * | 12/1990 | Macaulay | ............. B41M 5/124 |
| | | | | 427/150 |
| 2010/0184233 A1 | | 7/2010 | Watanabe et al. | |
| 2012/0015174 A1 | | 1/2012 | Kuo et al. | |
| 2012/0157303 A1 | | 6/2012 | Aosaki et al. | |

FOREIGN PATENT DOCUMENTS

| | | | | | |
|---|---|---|---|---|---|
| CN | 102757681 | A | | 10/2012 | |
| DE | 3512565 | A1 | * | 10/1986 | .......... B41M 5/1243 |
| JP | S47-020972 | B | | 6/1972 | |
| JP | S50-007032 | B1 | | 3/1975 | |
| JP | S51-50771 | A | | 5/1976 | |
| JP | S52-088380 | A | | 7/1977 | |
| JP | S54-041177 | A | | 4/1979 | |
| JP | S54-78186 | A | | 6/1979 | |
| JP | S58-038190 | A | | 3/1983 | |
| JP | H02-182980 | A | | 7/1990 | |
| JP | H03-247484 | A | | 11/1991 | |
| JP | H05-77588 | A | | 3/1993 | |
| JP | H05-224426 | A | | 9/1993 | |
| JP | H07-260955 | A | | 10/1995 | |
| JP | H10-086511 | A | | 4/1998 | |
| JP | 2004000959 | A | * | 1/2004 | |
| JP | 2004-267877 | A | | 9/2004 | |
| JP | 2009-019949 | A | | 1/2009 | |
| JP | 2009-063512 | A | | 3/2009 | |
| JP | 2009-063549 | A | | 3/2009 | |
| JP | 2015-168500 | A | | 9/2015 | |
| TW | 201235225 | A | | 9/2012 | |
| WO | WO-2009072427 | A1 | * | 6/2009 | ............. G01L 1/247 |

OTHER PUBLICATIONS

Office Action dated Jan. 28, 2020 issued by the JPO in corresponding Japanese Patent Application No. 2020-004515.
Explanation of Situation for Accelerated Examination dated Jan. 15, 2020 in corresponding Japanese Patent Application No. 2020-004514.
Explanation of Situation for Accelerated Examination dated Jan. 15, 2020 in corresponding Japanese Patent Application No. 2020-004515.
English language translation of the following: Office action dated Jun. 1, 2020, from the SIPO in a Chinese patent application No. 201780059700.X corresponding to the instant patent application.
Office Action dated Mar. 10, 2020 issued by the JPO in corresponding Japanese Patent Application No. 2020-004514.
Office Action dated Mar. 10, 2020 issued by the JPO in corresponding Japanese Patent Application No. 2020-004515.
Office Action dated Apr. 14, 2020 issued by the JPO in corresponding Japanese Patent Application No. 2020-004515.
English language translation of the following: Office action dated Jan. 18, 2021 from the SIPO in a Chinese patent application No. 201780059700.X corresponding to the instant patent application.
English language translation of the following: Office action dated Nov. 27, 2020 from the TIPO in a Taiwan patent application corresponding to the instant patent application. This office action translation is submitted now in order to supplement the understanding of patent document TW106132787 which is cited in the office action and is being disclosed in the instant Information Disclosure Statement.
Office Action dated Oct. 15, 2019, issued by the JPO in corresponding Japanese Patent Application No. 2018-542507.
International Search Report issued in International Application No. PCT/JP2017/034219 dated Dec. 19, 2017.
Written Opinion of the ISA issued in International Application No. PCT/JP2017/034219 dated Dec. 19, 2017.
English language translation of the following: Office action dated May 7, 2019 from the JPO in a Japanese patent application No. 2018-542507 corresponding to the instant patent application.
English language translation of the following: Office action dated Aug. 4, 2021 from the TIPO in a Taiwan patent application No. 106132787 corresponding to the instant patent application.

* cited by examiner

MATERIAL COMPOSITION FOR PRESSURE MEASUREMENT, MATERIAL FOR PRESSURE MEASUREMENT, AND MATERIAL SET FOR PRESSURE MEASUREMENT

CROSS-REFERENCE TO RELATED APPLICATION

This application is a Continuation of International Application No. PCT/JP2017/034219, filed Sep. 22, 2017, which claims priority to Japanese Patent Application No. 2016-191783 filed Sep. 29, 2016, and Japanese Patent Application No. 2017-110220 filed Jun. 2, 2017. Each of the above applications is hereby expressly incorporated by reference, in its entirety, into the present application.

BACKGROUND OF THE INVENTION

1. Field of the Invention

The present disclosure relates to a material composition for pressure measurement, a material for pressure measurement, and a material set for pressure measurement.

2. Description of the Related Art

A material for measuring pressure is used for applications to a step of bonding liquid crystal glass, solder printing onto a printed circuit board, and adjustment of pressure between rollers. As the material for measuring pressure, for example, there is a pressure measurement film represented by PRESCALE (trade name: registered trademark) provided by Fujifilm Corporation.

However, the measurable pressure range of the pressure measurement film on the market, that is, the range of pressure at which color formation is obtained by pressurization is in the range of 0.05 MPa or more, and in the weak pressure range below 0.05 MPa, the color formation necessary for detection is insufficient, or even in the case where color formation is obtained, it is difficult to obtain the density gradation necessary for judging the pressure difference.

In recent years, there is increasing necessity for measurement of the distribution of a minute pressure by virtue of higher functions and higher fineness of products. For example, in the field of liquid crystal panels, the number of cases in which a vacuum bonding method is adopted to cope with an increase in the area as a bonding method increases, and a grasp of pressure distribution in a range of the atmospheric pressure of 0.1 MPa or less has become important. In the field of smartphones, in view of improving the yield at the time of bonding, along with the thinning of the module, it is necessary to perform bonding with a minute pressure of 0.05 MPa or less, and it is necessary to precisely grasp the pressure distribution.

In view of the above, for example, in JP2009-019949A, a material for pressure measurement having a color forming density difference ΔD of 0.02 or more before and after pressurization at 0.05 MPa has been proposed in order to obtain a density that can be visually recognized or read with a minute pressure.

In addition, for example, JP2009-063512A discloses a material for pressure measurement in which color formation due to rubbing is suppressed, focusing on the number average wall thickness σ in the microcapsule and the surface roughness Ra of the color developer layer, as a two-sheet type material for pressure measurement which is capable of obtaining good color formation at a low pressure.

SUMMARY OF THE INVENTION

In the foregoing related arts, for example, a material in which the color forming density difference ΔD before and after pressurization at 0.05 MPa is improved, such as the material for pressure measurement described in JP2009-019949A, has been proposed. However, in order to detect the density and the density gradation in the case where a minute pressure below 0.05 MPa is applied, it is desired to select a material suitable for detecting a minute pressure of less than 0.05 MPa.

However, in the case where it is attempted to increase the sensitivity so as to obtain density and density gradation that can be visually recognized or read even in the case where a minute pressure below 0.05 MPa is applied, there is a problem that color formation due to rubbing or the like at the time of handling is likely to occur.

In other words, it is desired to establish a technique by which satisfactorily color formation is achieved in a pressure range below 0.05 MPa, color formation corresponding to a minute pressure difference (that is, density gradation) is obtained, and unnecessary color formation due to rubbing or the like can be suppressed.

The present disclosure has been made in view of the foregoing circumstances and provides a material composition for pressure measurement which exhibits excellent color developability and excellent color forming graininess at a minute pressure of less than 0.05 MPa and in which color formation due to rubbing is suppressed; a material for pressure measurement; and a material set for pressure measurement.

The present disclosure includes the following aspects.

<1> A material for pressure measurement, comprising a color forming layer that contains microcapsules A encapsulating an electron-donating colorless dye precursor and microcapsules B not encapsulating an electron-donating colorless dye precursor and in which a volume standard median diameter D50A of the microcapsules A and a volume standard median diameter D50B of the microcapsules B satisfy Equation 1:

$$D50A < D50B \qquad \text{Equation 1.}$$

<2> The material for pressure measurement according to <1>, in which the median diameter D50A satisfies Equation 2 and the median diameter D50B satisfies Equation 3:

$$10\ \mu m < D50A < 40\ \mu m \qquad \text{Equation 2}$$

$$40\ \mu m < D50B < 150\ \mu m \qquad \text{Equation 3.}$$

<3> The material for pressure measurement according to <1> or <2>, in which a volume standard median diameter D50X of all particles contained in the color forming layer satisfies Equation 4:

$$15\ \mu m < D50X < 50\ \mu m \qquad \text{Equation 4.}$$

<4> The material for pressure measurement according to any one of <1> to <3>, in which a coefficient of variation of particle size distribution of all particles contained in the color forming layer is 35% to 150%.

<5> The material for pressure measurement according to any one of <1> to <4>, in which, in a case of color formation, a density exceeding 0.02 is obtained as a density difference ΔD1 obtained by subtracting a density before applying a pressure from a density after color formation by applying a pressure at 0.01 MPa.

<6> The material for pressure measurement according to any one of <1> to <5>, in which a density difference ΔD2, which is obtained in such a manner that a color developing material having a color developer layer containing an electron-accepting compound is superimposed on the color forming layer so that the color developer layer having the same area as that of the color forming layer is brought into contact with the color forming layer, and a color forming density before scratching is subtracted from a color forming density after repeatedly scratching the color forming layer twenty times against the color developing material, is 0.02 or less.

<7> The material for pressure measurement according to any one of <1> to <6>, in which a ratio of a number average wall thickness $\delta^A$ of the microcapsule A to the volume standard median diameter D50A of the microcapsule A is $1.0 \times 10^{-3}$ to $4.0 \times 10^{-3}$, and a ratio of a number average wall thickness $\delta^B$ of the microcapsule B to the volume standard median diameter D50B of the microcapsule B is $1.0 \times 10^{-3}$ to $1.5 \times 10^{-2}$.

<8> The material for pressure measurement according to any one of <1> to <7>, which comprises at least a support, and an easy adhesion layer and the color forming layer arranged in order from the support side.

<9> The material for pressure measurement according to any one of <1> to <8>, in which two types of microcapsules having different volume standard median diameters D50A are contained as the microcapsules A.

<10> The material for pressure measurement according to any one of <1> to <9>, in which at least two types of microcapsules including microcapsules A1 having a median diameter of D50A1 and microcapsules A2 having a median diameter of D50A2 are contained as the microcapsules A, and in a case where the relationship of D50A1>D50A2 is satisfied, a ratio of the content of the microcapsules A1 to the content of the microcapsules A2 is 100/1 to 100/150 in terms of mass.

<11> The material for pressure measurement according to any one of <1> to <10>, in which the content of the microcapsules A and the microcapsules B in the color forming layer is 80% by mass to 97% by mass with respect to the total solid content of the color forming layer.

<12> A material set for pressure measurement, comprising the material for pressure measurement according to any one of <1> to <11> and a color developing material having a color developer layer containing an electron-accepting compound.

<13> A material composition for pressure measurement, comprising microcapsules A encapsulating an electron-donating colorless dye precursor and microcapsules B not encapsulating an electron-donating colorless dye precursor, in which a volume standard median diameter D50A of the microcapsules A and a volume standard median diameter D50B of the microcapsules B satisfy Equation 1:

$$D50A < D50B \qquad \text{Equation 1.}$$

<14> The material composition for pressure measurement according to <13>, in which the median diameter D50A satisfies Equation 2, and the median diameter D50B satisfies Equation 3:

$$10 \ \mu m < D50A < 40 \ \mu m \qquad \text{Equation 2}$$

$$40 \ \mu m < D50B < 150 \ \mu m \qquad \text{Equation 3.}$$

<15> The material composition for pressure measurement according to <13> or <14>, in which a ratio of the content of the microcapsules A to the content of the microcapsules B is 100/5 to 100/50 in terms of mass.

<16> The material composition for pressure measurement according to any one of <13> to <15>, in which a volume standard median diameter D50X of all particles contained in the composition satisfies Equation 4, and a coefficient of variation of particle size distribution of all particles contained in the composition is 35% to 150%:

$$15 \ \mu m < D50X < 50 \ \mu m \qquad \text{Equation 4.}$$

<17> The material composition for pressure measurement according to any one of <13> to <16>, in which two types of microcapsules having different volume standard median diameters D50A are contained as the microcapsules A.

According to the embodiment of the present invention, provided are a material composition for pressure measurement which exhibits excellent color developability at a minute pressure of less than 0.05 MPa and in which color formation due to rubbing is suppressed; a material for pressure measurement; and a material set for pressure measurement.

DESCRIPTION OF THE PREFERRED EMBODIMENTS

Figure 1:
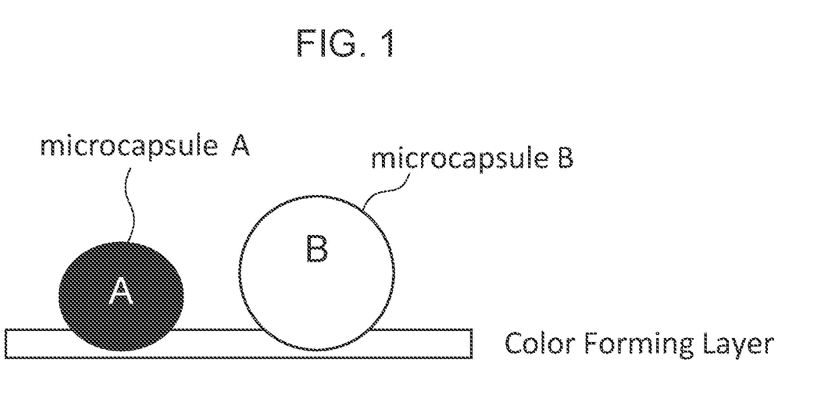
FIG. 1 is a schematic cross-section showing the positional relationship of the microcapsule A and microcapsule B relative to the color forming layer.
Figure 2:
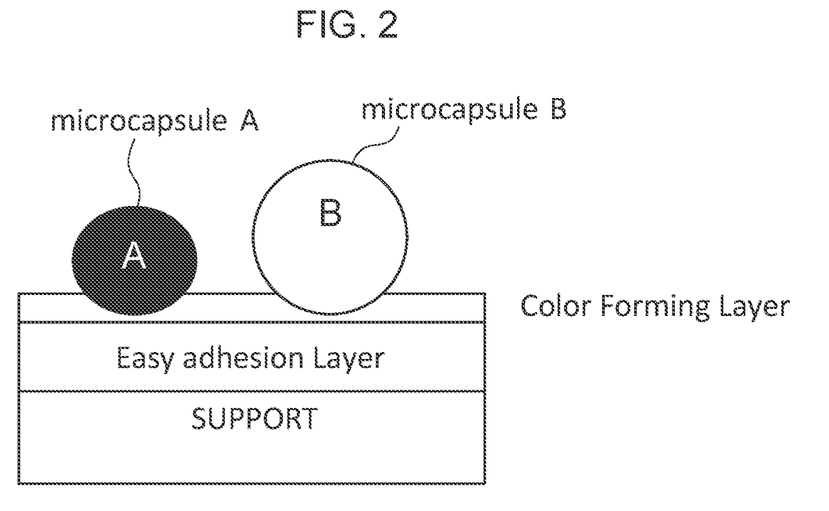
FIG. 2 is a schematic cross-section showing the positional relationship of the microcapsule A and microcapsule B relative to the color forming layer on the easy adhesion layer on the support.

Hereinafter, the material composition for pressure measurement, the material for pressure measurement, and the material set for pressure measurement of the present disclosure will be described in detail.

The notation "to" described in the present specification indicates a range including numerical values described before and after "to" as a minimum value and a maximum value, respectively.

In the numerical ranges described in a stepwise manner in the present specification, the upper limit value or the lower limit value described in a certain numerical range may be replaced with the upper limit value or the lower limit value of the numerical range in other stepwise description. In addition, in the numerical ranges described in the present specification, the upper limit value or the lower limit value described in a certain numerical range may be replaced with the values shown in the Examples.

Unless otherwise specified, the amount of each component in the composition referred to in the present specification means a total amount of a plurality of substances present in the composition in the case where a plurality of substances corresponding to each component are present in the composition.

In the present specification, a combination of preferred aspects is a more preferred aspect.

<Material for Pressure Measurement>

The material for pressure measurement of the present disclosure has a color forming layer that contains microcapsules A encapsulating an electron-donating colorless dye precursor and microcapsules B not encapsulating an electron-donating colorless dye precursor, in which a volume standard median diameter D50A of the microcapsules A and a volume standard median diameter D50B of the microcapsules B satisfy Equation 1. The material for pressure measurement of the present disclosure may have other layers such as a support and an easy adhesion layer, if necessary, in addition to the color forming layer.

$$D50A < D50B \quad \text{Equation 1}$$

The material for pressure measurement of the present disclosure is used in combination with a material (color developing material) having a color developer layer containing a color developer that makes color formation of an electron-donating colorless dye precursor which is a color-forming component in the color forming layer. Specifically, the material for pressure measurement of the present disclosure and the color developing material are superposed on each other by bringing the color forming layer of the material for pressure measurement into contact with the color developer layer of the color developing material, and in a state of being superposed, the resulting structure is used by installing it, for example, at the site to be measured to which a surface pressure is applied. For example, in the case where a surface pressure is applied and then in the case where the applied surface pressure is not uniform over the entire surface, a color formation with a density corresponding to the pressure occurs, and an image with density gradation is obtained.

All of materials used for measuring pressure, which have been conventionally proposed and widely used, are suitably used for detecting a pressure in the range of 0.05 MPa or more which is applied at the time of pressurization. However, in recent years, with the advancement of high functionality and high definition of products, the required pressure detection capability has been falling below 0.05 MPa. As described above, for example, material for pressure measurement and the like described in JP2009-019949A and JP2009-063512A have been conventionally provided, but the pressure range suitable for detection deviates from the pressure range demanded in recent years and therefore it tends to be difficult to easily measure the recently demanded pressure range with a conventional material for pressure measurement or the like.

On the other hand, it is difficult to design a material for pressure measurement so that good color formation can be obtained with a minute pressure and density gradation appears corresponding to a wide pressure range. For example, in the case where the sensitivity is increased in order to make a detection with a minute pressure, the color formation is excessive with a minute pressure, consequently the pressure range in which the density gradation appears tends to be narrowed, and color formation occurs due to slight rubbing or the like during handling, and therefore unexpected color formation tends to be mixed in the image.

In view of the above, in the material for pressure measurement according to one embodiment of the present invention, microcapsules B having a larger diameter than microcapsules A and not encapsulating a color-forming component are mixed in a color forming layer containing microcapsules A encapsulating an electron-donating colorless dye precursor which is a color-forming component. Thus, necessary color forming sensitivity is obtained and unnecessary color formation is suppressed. By taking color formation balance with respect to a minute pressure, it is possible to provide a material for pressure measurement which exhibits excellent color developability at a minute pressure of less than 0.05 MPa and in which color formation due to rubbing is suppressed.

Here, the volume standard median diameter of the microcapsule refers to a diameter (D50) at which the cumulative volume of particles on the large diameter side and the cumulative volume of particles on the small diameter side are equal in the case where the particle diameter at which the cumulative volume of the microcapsules becomes 50% is divided into two threshold values.

For example, the volume standard median diameter of the microcapsule A refers to a particle diameter (D50A) at which the cumulative volume of particles on the large diameter side and the cumulative volume of particles on the small diameter side are equal in the case where the particle diameter at which the cumulative volume of the microcapsules A becomes 50% is divided into two threshold values. In addition, the volume standard median diameter of all particles contained in the color forming layer refers to a particle diameter (D50X) at which the cumulative volume of particles on the large diameter side and the cumulative volume of particles on the small diameter side are equal in the case where the particle diameter at which the cumulative volume of particles containing microcapsules becomes 50% is divided into two threshold values, and includes the particle distribution of microcapsules and other particles than the microcapsules.

The volume standard median diameter is a value calculated by applying a microcapsule liquid on a support, photographing the surface of a coating film formed after drying with an optical microscope at a magnification of 150×, and measuring the sizes of all the microcapsules in the range of 2 cm×2 cm.

[Color Forming Layer]

The material for pressure measurement according to one embodiment of the present invention has at least one color forming layer.

The color forming layer contains at least one microcapsule A encapsulating an electron-donating colorless dye precursor and at least one microcapsule B not encapsulating an electron-donating colorless dye precursor, and may further contain other components, if necessary.

In addition to the microcapsule A which contributes to color formation in the case where a pressure is applied, the color forming layer includes microcapsule B which has a median diameter larger than that of the microcapsule A (D50A<D50B), does not encapsulate an electron-donating colorless dye precursor, and does not exhibit color formation under pressurization, whereby, in the case where an unexpected minute pressure is applied, the microcapsule B is broken first to prevent destruction of the microcapsule A, so that the color developability is suppressed low. As a result, unnecessary color formation due to rubbing or the like is suppressed.

Further, it is preferred that the microcapsule B contains a solvent or the like as an oil component. In the case where an unexpected minute pressure is applied, the microcapsule B is broken before the microcapsule A and then the microcapsule A is broken, resulting in a state in which the oil component in the microcapsule B stains in the plane direction of the color forming layer and the color developer layer, so that the reactivity of the color-forming component with the color developer in the case where the microcapsule A breaks to exhibit color formation is improved, and therefore the color forming sensitivity is improved. As a result, it is possible to reproduce a density gradation that is excellent in color developability with a minute pressure while suppressing unnecessary color formation with a minute pressure due to rubbing or the like, and that corresponds to a wide pressure range.

In the material for pressure measurement according to one embodiment of the present invention, the microcapsule A and the microcapsule B contained in the color forming layer satisfy the relationship of Equation 1.

$$D50A < D50B \quad \text{Equation 1}$$

In Equation 1, D50A represents the volume standard median diameter of the microcapsule A, and D50B represents the volume standard median diameter of the microcapsule B.

Since D50A is smaller than D50B, color formation with a minute pressure during handling such as rubbing (scratching) is suppressed.

Incidentally, for example, in the case of containing two or more types of microcapsules A having different median diameters, D50A is preferably smaller than D50B in any microcapsule A from the viewpoint of suppression of color formation due to rubbing or the like. In a more preferred aspect, all the microcapsules A satisfy Equation 1.

The microcapsules A and B satisfying Equation 1 preferably further satisfy that the volume standard median diameter D50A of the microcapsule A satisfies Equation 2, and the volume standard median diameter D50B of the microcapsule B satisfies Equation 3.

$$10 \; \mu m < D50A < 40 \; \mu m \quad \text{Equation 2}$$

$$40 \; \mu m < D50B < 150 \; \mu m \quad \text{Equation 3}$$

Since the microcapsules A and B each have the above-mentioned particle diameter, it is possible to more effectively prevent unnecessary color formation due to rubbing or the like.

Specifically, in the case where D50A is less than 40 µm, the color developability does not become too high, and color formation due to rubbing or the like is more effectively suppressed. In addition, in the case where D50A is larger than 10 µm, the difference between D50A and D50B does not become too large, and therefore the CV value described later does not become too large, so that coating unevenness is less likely to occur in the case where a color forming layer is applied and dried. Specifically, in the case where the color forming layer is applied and dried, unevenness in contrasting density caused by drying is less likely to occur.

In the case where D50B is less than 150 µm, the CV value described later does not become too large, the density gradation becomes favorable, and therefore the occurrence of coating unevenness is further suppressed. In the case where D50B is larger than 40 µm, it is possible to more effectively prevent color formation due to rubbing or the like, since the difference between D50A and D50B can be maintained.

Among the above, from the same viewpoint as above, it is more preferred that Equation 2-1 and Equation 3-1 are satisfied.

$$10 \; \mu m < D50A < 40 \; \mu m \quad \text{Equation 2-1}$$

$$40 \; \mu m < D50B < 100 \; \mu m \quad \text{Equation 3-1}$$

Furthermore, it is preferable to satisfy Equation 2-2 and Equation 3-2.

$$10 \; \mu m < D50A < 40 \; \mu m \quad \text{Equation 2-2}$$

$$40 \; \mu m < D50B < 80 \; \mu m \quad \text{Equation 3-2}$$

Furthermore, it is preferable to satisfy Equation 2-3 and Equation 3-3.

$$25 \; \mu m < D50A < 35 \; \mu m \quad \text{Equation 2-3}$$

$$40 \; \mu m < D50B < 80 \; \mu m \quad \text{Equation 3-3}$$

The coefficient of variation (CV; hereinafter also referred to as CV value) of the particle size distribution of all particles contained in the color forming layer is preferably 35% to 150%.

In the case where the CV value is within the above range, the particle distribution in the color forming layer, in particular, the relative variation of the microcapsules is small, so that it is excellent in the balance between the color developability with respect to a minute pressure and the property of preventing color formation due to rubbing or the like.

The CV value is preferably 40% to 110% and more preferably 40% to 80%.

The CV value represents the relative variation of the particles of the color forming layer and is a value obtained from the following.

CV value (%)=standard deviation/arithmetic average particle diameter×100

The arithmetic average particle diameter and the standard deviation are values calculated by photographing the surface of the color forming layer with an optical microscope at a magnification of 150× and measuring the sizes of all the microcapsules in the range of 2 cm×2 cm.

The number average wall thickness $\delta^A$ of the microcapsule A depends on various conditions such as the type of the capsule wall material and the capsule diameter, but is preferably 0.01 µm to 0.15 µm and more preferably 0.02 µm to 0.10 µm, from the viewpoint that it can be broken at a pressure below 0.05 MPa.

The number average wall thickness $\delta^B$ of the microcapsule B also depends on various conditions such as the type of the capsule wall material and the capsule diameter, but is preferably 0.05 µm to 1.0 µm and more preferably 0.07 µm to 0.80 µm, from the viewpoint that it is easily broken than the microcapsule A.

The wall thickness of the microcapsule refers to a thickness (µm) of the resin film (so-called capsule wall) forming the capsule particle of the microcapsule, and the number average wall thickness refers to an average value obtained by calculating the thickness (µm) of individual capsule walls of five microcapsules by a scanning electron microscope (SEM) and averaging the calculated values. Specifically, first, a microcapsule liquid is applied on any support and dried to form a coating film. A cross-sectional slice of the obtained coating film is prepared and its cross section is observed using SEM. Any five microcapsules are selected, and the cross section of each selected microcapsule is observed to determine the thickness of the capsule wall, and the average value is calculated.

The ratio ($\delta^A$/D50A) of the number average wall thickness $\delta^A$ of the microcapsule A to the volume standard median diameter D50A of the microcapsule A is preferably $1.0 \times 10^{-3}$ to $4.0 \times 10^{-3}$. In the case where the ratio of $\delta^A$/D50A is within the above range, the capsule size and the capsule wall thickness are well-balanced, there is little fear of leakage of encapsulated matters over time due to a too thin capsule wall, and the color developability is excellent in a minute pressure range below 0.05 MPa.

In the case where the ratio of $\delta^A$/D50A is $1.0 \times 10^{-3}$ or more, destruction due to rubbing or the like is less likely to occur easily, unnecessary color formation is suppressed, and density gradation property is excellent. Further, in the case where the ratio of $\delta^A/D50A$ is $4.0\times10^{-3}$ or less, the effect of suppressing color formation due to rubbing or the like is excellent, and the wall thickness relative to the particle size is not too large, so that the density gradation property is excellent.

The ratio of $\delta^A/D50A$ is more preferably $1.3\times10^{-3}$ to $2.5\times10^{-3}$.

The ratio of the number average wall thickness $\delta^B$ of the microcapsule B to the volume standard median diameter D50B of the microcapsule B is preferably $1.0\times10^{-3}$ to $1.5\times10^{-2}$. In the case where the ratio of $\delta^B/D50B$ is $1.0\times10^{-3}$ or more, it is advantageous in that the capsule structure can be easily maintained in the production process of the material for pressure measurement, and excellent density gradation can be obtained. In addition, in the case where the ratio of $\delta^B/D50B$ is $1.5\times10^{-2}$ or less, it maintains the property of being broken in the case where a minute pressure due to rubbing or the like is applied, and is excellent in color developability at a minute pressure of less than 0.05 MPa.

The ratio of $\delta^B/D50B$ is more preferably $1.0\times10^{-3}$ to $8.0\times10^{-3}$.

In the material for pressure measurement according to one embodiment of the present invention, in the case where color formation is made in combination with a color developing material, it is preferred that a density in the range exceeding 0.02 is obtained as the density difference ($\Delta D1$) obtained by subtracting the density before applying a pressure from the density after color formation by applying a pressure at 0.01 MPa.

The density difference before and after pressurization at a pressure of 0.01 MPa refers to a density difference obtained by subtracting the density before applying a pressure at 0.01 MPa from the density after color formation by applying a pressure at 0.01 MPa.

Since $\Delta D1$ color-formed due to the color forming layer exceeds 0.02, the color forming layer in one embodiment of the present invention is capable of reproducing density and density gradation that can be visually recognized or read in the case where color formation is carried out by applying a minute pressure below 0.05 MPa.

$\Delta D1$ is preferably as large as possible, more preferably 0.05 or more, and still more preferably 0.1 or more.

The color forming density is a value measured using a densitometer RD-19 (manufactured by Gretag-Macbeth AG). The same applies below.

Further, a density difference ($\Delta D2$), which is obtained in such a manner that a color developing material having a color developer layer containing an electron-accepting compound is superimposed on the color forming layer so that a color developer layer having the same area as that of the color forming layer is brought into contact with the color forming layer, and the color forming density before scratching is subtracted from the color forming density after repeatedly scratching the color forming layer twenty times against the color developing material, is preferably suppressed to 0.02 or less and is more preferably suppressed to less than 0.02.

In the case where $\Delta D2$ is 0.02 or less, the color formation reaching the visible or readable density due to rubbing or the like can be suppressed to a small extent.

$\Delta D2$ is preferably as small as possible, more preferably 0.01 or less, and still more preferably zero (that is, color formation does not occur).

The volume standard median diameter D50X of all particles contained in the color forming layer preferably satisfies Equation 4. All particles contained in the color forming layer include not only microcapsules but also particles other than the microcapsules. In the case where particles other than the microcapsules contain, for example, a pigment or the like, they also include pigment particles and the like.

$$15\ \mu m < D50X < 50\ \mu m \qquad \text{Equation 4}$$

In the case where the entirety of the particles contained in the color forming layer is in the above particle diameter range, the effect of mixing the microcapsules B having a larger particle diameter than the microcapsule A encapsulating the color-forming component, that is, the effect of suppressing unnecessary color formation due to rubbing or the like appears more effectively.

Specifically, in the case where D50X is larger than 15 μm, it is more advantageous from the viewpoint of exhibiting a visible color forming density even with a minute pressure of 0.01 MPa. In addition, in the case where D50X is smaller than 50 μm, it is more advantageous from the viewpoint of suppressing unnecessary color formation due to rubbing or the like and exhibiting effective density gradation.

Next, individual components contained in the color forming layer in one embodiment of the present invention will be described in detail.

—Microcapsule A—

The microcapsule A encapsulates an electron-donating colorless dye precursor which is a color-forming component, preferably encapsulates a solvent, and may further encapsulate an auxiliary solvent, an additive, and the like, if necessary.

(Electron-Donating Colorless Dye Precursor)

The microcapsule A encapsulates at least one electron-donating colorless dye precursor as a color-forming component.

As the electron-donating colorless dye precursor, those known for use in pressure-sensitive copying paper or heat-sensitive recording paper may be used. For example, various types of compounds such as a triphenylmethane phthalide-based compound, a fluoran-based compound, a phenothiazine-based compound, an indolyl phthalide-based compound, a leucoauramine-based compound, a rhodaminelactam-based compound, a triphenylmethane-based compound, a diphenylmethane-based compound, a triazene-based compound, a spiropyran-based compound, and a fluorene-based compound may be used.

For the details of these compounds, reference can be made to the description in JP1993-257272A (JP-H05-257272A).

The electron-donating colorless dye precursors may be used alone or in combination of two or more thereof.

The molar extinction coefficient (ε) of the electron-donating colorless dye precursor is preferably higher from the viewpoint of enhancing color developability in a minute pressure range below 0.05 MPa and exhibiting high density at a minute pressure, that is, a density change (that is, density gradient) corresponding to a wide pressure range. The molar extinction coefficient (ε) of the electron-donating colorless dye precursor is preferably 10,000 $mol^{-1} \cdot cm^{-1} \cdot L$ or more, more preferably 15,000 $mol^{-1} \cdot cm^{-1} \cdot L$ or more, and still more preferably 25,000 $mol^{-1} \cdot cm^{-1} \cdot L$ or more.

Preferred examples of the electron-donating colorless dye precursor having a molar extinction coefficient (ε) in the above range include 3-(4-diethylamino-2-ethoxyphenyl)-3-(1-ethyl-2-methylindol-3-yl)-4-azaphthalide (ε=61000), 3-(4-diethylamino-2-ethoxyphenyl)-3-(1-n-octyl-2-methyl-indol-3-yl)phthalide (ε=40000), 3-[2,2-bis(1-ethyl-2-methylindol-3-yl)vinyl]-3-(4-diethylaminophenyl)-phthalide (ε=40000), 9-[ethyl(3-methylbutyl)amino]spiro[12H-benzo

[a]xanthene-12,1'(3'H)isobenzofuran]-3'-one (ε=34000), 2-anilino-6-dibutylamino-3-methylfluoran (ε=22000), 6-diethylamino-3-methyl-2-(2,6-xylidino)-fluoran (ε=19000), 2-(2-chloroanilino)-6-dibutylaminofluoran (ε=21000), 3,3-bis(4-dimethylaminophenyl)-6-dimethylaminophthalide (ε=16000), and 2-anilino-6-diethylamino-3-methylfluoran (ε=16000).

In the case where one type of an electron-donating colorless dye precursor having a molar extinction coefficient (ε) in the above range is used alone or two or more types of electron-donating colorless dye precursors having a molar extinction coefficient (ε) in the above range are used in combination, the percentage of the electron-donating colorless dye precursor having a molar extinction coefficient (ε) of 10,000 $mol^{-1} \cdot cm^{-1} \cdot L$ or more, with respect to the total amount of the electron-donating colorless dye precursor, is preferably in the range of 10% by mass to 100% by mass, more preferably in the range of 20% by mass to 100% by mass, and still more preferably in the range of 30% by mass to 100% by mass, from the viewpoint of enhancing color developability in a minute pressure range below 0.05 MPa and exhibiting a density change (that is, density gradient) over a wide pressure range.

In the case where two or more types of electron-donating colorless dye precursors are used, it is preferable to use two or more types of electron-donating colorless dye precursors each having a molar extinction coefficient (ε) of 10,000 $mol^{-1} \cdot cm^{-1} \cdot L$ or more in combination. The molar extinction coefficient (ε) can be calculated from the absorbance in the case where an electron-donating colorless dye is dissolved in a 95% by mass acetic acid aqueous solution. Specifically, for a 95% by mass acetic acid aqueous solution of the electron-donating colorless dye whose concentration is adjusted so that the absorbance is 1.0 or less, the molar extinction coefficient (ε) can be calculated from the following equation, assuming that the length of a measurement cell is A cm, the concentration of the electron-donating colorless dye is B mol/L, and the absorbance is C.

$$\text{Molar extinction coefficient } (\varepsilon) = C/(A \times B)$$

From the viewpoint of enhancing the color developability in a minute pressure range below 0.05 MPa, the content (for example, coating amount) of the electron-donating colorless dye precursor in the color forming layer is preferably 0.1 $g/m^2$ to 5 $g/m^2$, more preferably 0.1 $g/m^2$ to 4 $g/m^2$, and still more preferably 0.2 $g/m^2$ to 3 $g/m^2$ in terms of mass after drying.

(Solvent)

The microcapsule A preferably encapsulates at least one solvent.

Solvents known in the pressure-sensitive copying paper application may be used as the solvent, and examples thereof include aromatic hydrocarbons such as an alkylnaphthalene-based compound such as diisopropylnaphthalene, a diarylalkane-based compound such as 1-phenyl-1-xylylethane, an alkylbiphenyl-based compound such as isopropylbiphenyl, a triarylmethane-based compound, an alkylbenzene-based compound, a benzylnaphthalene-based compound, a diarylalkylene-based compound, and an arylindane-based compound; aliphatic hydrocarbons such as dibutyl phthalate and isoparaffin; natural animal and vegetable oils such as soybean oil, corn oil, cottonseed oil, rape seed oil, olive oil, palm oil, castor oil, and fish oil; and high-boiling point fractions of natural products such as mineral oil.

The solvents may be used alone or in combination of two or more thereof.

The mass ratio of the solvent and the electron-donating dye precursor (solvent:precursor) encapsulated in the microcapsule A is preferably in the range of 98:2 to 30:70, more preferably in the range of 97:3 to 40:60, and still more preferably in the range of 95:5 to 50:50, from the viewpoint of color developability.

(Auxiliary Solvent)

The microcapsule A may encapsulate an auxiliary solvent as necessary.

The auxiliary solvent may be, for example, a solvent having a boiling point of 130° C. or lower, examples of which include a ketone-based compound such as methyl ethyl ketone, an ester-based compound such as ethyl acetate, and an alcohol-based compound such as isopropyl alcohol.

(Other Components)

The microcapsule A may encapsulate an additive, if necessary, in addition to the electron-donating colorless dye precursor, the solvent, and the auxiliary solvent. Examples of the additives include an ultraviolet absorber, a light stabilizer, an antioxidant, a wax, and an odor control agent.

The content (coating amount in the case of coating) of the microcapsule A in the color forming layer is preferably 50% by mass to 80% by mass and more preferably 60% by mass to 75% by mass, with respect to the total solid content mass of the color forming layer.

—Microcapsule B—

The microcapsule B is a capsule not encapsulating an electron-donating colorless dye precursor which is a color-forming component, preferably encapsulates a solvent as an oil component, and may further encapsulate an auxiliary solvent, an additive, or the like, if necessary.

The expression "the microcapsule B does not encapsulate the electron-donating colorless dye precursor" means that the microcapsule B is substantially not encapsulating the electron-donating colorless dye precursor, specifically, it means that the amount of the electron-donating colorless dye precursor encapsulated in the microcapsule B is less than 5% by mass and preferably 0 (zero) % by mass with respect to the total mass of encapsulated matters.

In the case where the microcapsule B encapsulates the electron-donating colorless dye precursor, the encapsulated electron-donating colorless dye precursor is selected to be encapsulated from the electron-donating colorless dye precursor that can be encapsulated in the microcapsule A.

The microcapsule B may be formed into capsule properties such as the composition of the capsule wall material or the like, production conditions, the capsule wall thickness, particle size and the like similar to those of the microcapsule A, except that it does not encapsulate the electron-donating colorless dye precursor.

In this case, components such as solvents, auxiliary solvents, and additives that can be encapsulated in the microcapsule B can be selected from the same components as the solvents, auxiliary solvents, additives, and the like that can be encapsulated in the microcapsule A.

Apart from the above, the microcapsule B may be contained as a microcapsule different in composition, capsule properties, and production conditions from the microcapsule A, in addition to not encapsulating the electron-donating colorless dye precursor.

The content of the microcapsule B (that is, the coating amount in the case of coating) in the color forming layer is preferably 5% by mass to 35% by mass, more preferably 10% by mass to 30% by mass, and still more preferably 10% by mass to 25% by mass, with respect to the total solid content mass of the color forming layer.

The color forming layer may contain two or more types of microcapsules A having different median diameters or may contain two or more types of microcapsules B having different median diameters.

In the case where two or more types of microcapsules A having different median diameters are contained, the number of microcapsules having a large diameter which are destroyed decreases as the pressure increases, and subsequently microcapsules having a small diameter break down to exhibit color formation, and therefore the color forming density in the high pressure region is improved, thus resulting in an excellent pressure measurement material due to the density gradation in a high density region.

The thickness of the color forming layer is not particularly limited and can be selected according to the purpose and the like.

The thickness of the color forming layer (the thickness excluding the microcapsules exposed from the layer surface in the case where the microcapsule diameter is larger than the layer thickness) is preferably 0.01 µm to 0.10 µm and more preferably 0.02 µm to 0.07 µm.

There is no particular limitation on the method of producing the microcapsules, and conventionally known methods can be applied. For example, reference can be made to the method described in paragraphs [0036] to [0044] of JP2009-019949A.

—Material Composition for Pressure Measurement—

The color forming layer can be formed by preparing a material composition for pressure measurement and forming a film using the prepared composition.

The color forming layer may be formed, for example, by applying a material composition for pressure measurement (a color forming layer-forming preparation liquid) onto a support by a method such as application and drying the applied composition.

The microcapsules contained in the color forming layer may be obtained as a dispersion liquid as described above. The obtained microcapsule dispersion liquid may be used as it is as a material composition for pressure measurement (a color forming layer-forming preparation liquid; for example, a coating liquid) for forming a color forming layer containing an electron-donating colorless dye precursor.

In addition, the material composition for pressure measurement may be prepared by further adding a water-soluble high-molecular-weight binder (for example, a fine powder of starch or starch derivatives, a buffer such as a cellulose fiber powder, or a polyvinyl alcohol), a hydrophobic high-molecular-weight binder (for example, a vinyl acetate-based, acrylic-based, or styrene/butadiene copolymer latex), a surfactant, inorganic particles (for example, silica particles), a fluorescent whitening agent, an antifoaming agent, a penetrating agent, an ultraviolet absorber, a preservative, and the like to the obtained microcapsule dispersion liquid.

Examples of the surfactant used in the color forming layer include sodium alkylbenzene sulfonate (for example, NEOGEN T, manufactured by DKS Co., Ltd.) which is an anionic surfactant, and polyoxyalkylene lauryl ether (for example, NOIGEN LP 70, manufactured by DKS Co., Ltd.) which is a nonionic surfactant.

Examples of the silica particles used in the color forming layer include vapor phase method silica and colloidal silica. As examples of commercially available products of the silica particles, SNOWTEX (registered trademark) series (for example, SNOWTEX 30) manufactured by Nissan Chemical Industries, Ltd. can be used.

The microcapsule A and the microcapsule B contained in the material composition for pressure measurement for forming a color forming layer satisfy the relationship of Equation 1. In Equation 1, D50A represents the volume standard median diameter of the microcapsule A, and D50B represents the volume standard median diameter of the microcapsule B.

$$D50A < D50B \qquad \text{Equation 1}$$

Since D50A is smaller than D50B, color formation with a minute pressure at the time of handling such as rubbing (for example, scratching) is suppressed as described above.

As in the case of the above-described color forming layer, the microcapsules A and B satisfying Equation 1 preferably further satisfy that the volume standard median diameter D50A of the microcapsule A satisfies Equation 2, and the volume standard median diameter D50B of the microcapsule B satisfies Equation 3.

$$10\ \mu m < D50A < 40\ \mu m \qquad \text{Equation 2}$$

$$40\ \mu m < D50B < 150\ \mu m \qquad \text{Equation 3}$$

Since the microcapsules A and B each have the above-mentioned particle diameter, it is possible to more effectively prevent unnecessary color formation due to rubbing or the like. Details thereof are as described above, and preferred embodiments are also the same.

The ratio of the content of microcapsule A to the content of microcapsule B (capsule A/capsule B) contained in the material composition for pressure measurement for forming a color forming layer is preferably 100/5 to 100/50 in terms of mass.

By including the microcapsule A in an amount equal to or greater than the amount of the microcapsule B, it is possible to achieve a balance between the color developability with respect to a minute pressure and the effect of suppressing color formation against a minute pressure applied at the time of handling such as rubbing.

The above ratio is more preferably 100/10 to 100/40 and still more preferably 100/15 to 100/35 in terms of mass.

As in the case of the color forming layer, the material composition for pressure measurement is preferably such that the volume standard median diameter D50X of all the contained particles satisfies Equation 4, and the coefficient of variation (CV value) of the particle size distribution of all the contained particles is 35% to 150%. All particles contained in the material composition for pressure measurement include not only microcapsules but also particles other than the microcapsules. In the case where particles other than the microcapsules contain, for example, a pigment or the like, they also include pigment particles and the like.

$$15\ \mu m < D50X < 50\ \mu m \qquad \text{Equation 4}$$

In the case where the entirety of the particles contained in the material composition for pressure measurement is in the above particle diameter range, the effect of mixing the microcapsules B having a larger particle diameter than the microcapsule A encapsulating the color-forming component, that is, the effect of suppressing unnecessary color formation due to rubbing or the like appears more effectively.

In addition, in the case where the CV value is within the above range, the particle distribution in the color forming layer, in particular, the relative variation of the microcapsules is small, so that the balance between the color developability with respect to a minute pressure and the property of preventing color formation due to rubbing or the like is excellent.

The CV value is preferably 40% to 110% and more preferably 40% to 80%.

The material composition for pressure measurement is also suitably an aspect in which two or more types of microcapsules having different volume standard median diameters (D50A) are contained as the microcapsule A.

In the case where two or more types of microcapsules having different D50A are contained, generally, after microcapsules with large diameters break down in pressure in order to exhibit color formation, the number of large diameter microcapsules which are destroyed decreases as the pressure increases, and subsequently small diameter microcapsules break down to exhibit color formation. Therefore, the color forming density in the region on the higher pressure side is improved. As a result, an excellent pressure measurement material can be obtained due to the density gradation in a high density region.

Upon making a composition containing at least two microcapsules A having different volume standard median diameters (D50A), including microcapsules A1 having a median diameter of D50A1 and microcapsules A2 having a median diameter of D50A2, in the case where the median diameters of the two types of microcapsules A1 and A2 satisfy the following equation, $$D50A1 > D50A2$$

the ratio of the content of the microcapsule A1 to the content of the microcapsule A2 (A1/A2) in the color forming layer is preferably 100/1 to 100/150, more preferably 100/25 to 100/100, and still more preferably 100/40 to 100/70 in terms of mass. In the case where the ratio (A1/A2) of the contents in the case of satisfying the above inequality expression is within the above range, it becomes excellent in density gradation.

The total content (the coating amount in the case of coating) of the microcapsule A and the microcapsule B in the color forming layer is preferably 80% by mass to 97% by mass with respect to the total solid content mass of the color forming layer.

In the case where the content of the microcapsule A and the microcapsule B is within the above range, the amount of other components existing around the microcapsules becomes small, the microcapsules easily break in the case of being subjected to a pressure, and color formation becomes easy even at a low pressure. In addition, since the sensitivity to pressure is improved, the volume standard median diameter of the microcapsule A and the microcapsule B also becomes small, and as a result, the graininess at the time of color formation can be suppressed to a low level. Therefore, even in the case where measurement is carried out within a narrow pressure range, the measurement can be carried out with high accuracy.

In the case where the content of the microcapsule A and the microcapsule B is 80% by mass or more, the sensitivity to pressure becomes better. In addition, in the case where the content of the microcapsule A and the microcapsule B is 98% by mass or less, the adhesiveness between the microcapsule and the substrate can be easily secured.

The total content of the microcapsule A and the microcapsule B is more preferably 85% by mass to 96% by mass and still more preferably 85% by mass to 95% by mass.

In the case where a color forming layer is formed by applying a color forming layer-forming preparation liquid, coating can be carried out by a known coating method. The coating method may be, for example, a coating method using an air knife coater, a rod coater, a bar coater, a curtain coater, a gravure coater, an extrusion coater, a die coater, a slide bead coater, a blade coater, or the like.

The material for pressure measurement according to one embodiment of the present invention is preferably an aspect having at least a support, and an easy adhesion layer and a color forming layer arranged in order from the support side.

[Easy Adhesion Layer]

The easy adhesion layer is preferably provided for improving the adhesiveness between the support and the color forming layer. In addition, the easy adhesion layer further has an effect of suppressing aggregation of microcapsules through an electrostatic interaction (for example, hydrogen bonding) of the microcapsules with the easy adhesion layer in the case where a composition containing microcapsules is applied and dried. This improves the effect of microcapsules being destroyed by a minute pressure in the case of measuring a pressure.

The easy adhesion layer may be a layer containing urethane polymer, block isocyanate, or the like.

The thickness of the easy adhesion layer is not particularly limited and can be selected according to the purpose and the like.

The thickness of the easy adhesion layer is preferably 0.005 μm to 0.2 μm and more preferably 0.01 μm to 0.1 μm.

[Support]

The support may have any of a sheet-like shape, a film-like shape, a plate-like shape, and the like.

Specific examples of the support include a paper, a plastic film, and a synthetic paper.

Specific examples of the paper may include a high-quality paper, a medium-quality paper, a woody paper, an alkaline paper, an acid paper, a recycled paper, a coated paper, a machine coated paper, an art paper, a cast-coated paper, a fine coated paper, and a tracing paper.

Specific examples of the plastic film may include a polyester film such as polyethylene terephthalate film, a cellulose derivative film such as cellulose triacetate, a polyolefin film such as polypropylene or polyethylene, and a polystyrene film.

Specific examples of the synthetic paper include those having a large number of microvoids formed by biaxially stretching polypropylene, polyethylene terephthalate, or the like (YUPO and the like), those made of a synthetic fiber such as polyethylene, polypropylene, polyethylene terephthalate, or polyamide, and those having these synthetic papers laminated on a part, one side or both sides of paper.

Above all, a plastic film or a synthetic paper is preferable and a plastic film is more preferable, from the viewpoint of further increasing the color forming density generated by pressurization.

The material for pressure measurement according to one embodiment of the present invention is used as one sheet of a so-called two-sheet type material in which microcapsules encapsulating a color-forming component and a color developer are applied to separate substrates.

The two-sheet type has a material for pressure measurement having a color forming layer containing microcapsules encapsulating a color-forming component on the substrate, and a color developing material having a color developer layer containing a color developer on the substrate. In this case, the pressure measurement can be carried out in such a manner that the material for pressure measurement and the color developing material are superimposed with each other while bringing the surface of the color forming layer of the material for pressure measurement into contact with the surface of the color developer layer of the color developing material, and the superimposed structure is placed in a position where pressure or pressure distribution is to be measured while being superimposed, followed by pressurization.

The pressurization can be carried out by giving a pressure in a point, linear or area (such as point pressure, linear pressure, surface pressure, or the like) in any method. The material for pressure measurement according to one embodiment of the present invention is effective, particularly at a minute pressure range of less than 0.05 MPa, in the case where a difference in color forming density (that is, a density difference) for differentiating a minute pressure difference is small and a surface pressure that differential pressure is hardly grasped is given.

<Material Set for Pressure Measurement>

The material set for pressure measurement according to one embodiment of the present invention is a two-sheet type material including the material for pressure measurement according to one embodiment of the present invention described above and a color developing material having a color developer layer containing an electron-accepting compound. The material set for pressure measurement according to one embodiment of the present invention may contain other materials, if necessary, in addition to the material for pressure measurement and the color developing material.

The details of the material for pressure measurement in the material set for pressure measurement are as described above, and preferred aspects thereof are also as described above.

—Color Developing Material—

The color developing material has a color developer layer containing an electron-accepting compound which is a color developer for making color formation of the color-forming component contained in the color forming layer of the material for pressure measurement. The color developing material is preferably an aspect having at least a support and a color developer layer.

The color developer layer contains at least an electron-accepting compound which is a color developer and may contain other components such as a binder, a pigment, and an additive, if necessary.

(Electron-Accepting Compound)

The electron-accepting compound may include an inorganic compound and an organic compound.

Specific examples of the inorganic compound may include clay materials such as acid clay, activated white earth, attapulgite, zeolite, bentonite, and kaolin.

Specific examples of the organic compounds include a metal aromatic carboxylate, a phenol formaldehyde resin, and a carboxylated terpene phenol resin metal salt.

Among them, acid clay, activated white earth, zeolite, the kaolin, metal aromatic carboxylate, or carboxylated terpene phenol resin metal salt is preferable, and acid clay, activated white earth, kaolin, or metal aromatic carboxylate is more preferable as the electron-accepting compound.

Preferred specific examples of the metal aromatic carboxylate include zinc salts, nickel salts, aluminum salts, and calcium salts of 3,5-di-t-butylsalicylic acid, 3,5-di-t-octylsalicylic acid, 3,5-di-t-nonylsalicylic acid, 3,5-di-t-dodecylsalicylic acid, 3-methyl-5-t-dodecylsalicylic acid, 3-t-dodecylsalicylic acid, 5-t-dodecylsalicylic acid, 5-cyclohexylsalicylic acid, 3,5-bis($\alpha,\alpha$-dimethylbenzyl)salicylic acid, 3-methyl-5-($\alpha$-methylbenzyl)salicylic acid, 3-($\alpha,\alpha$-dimethylbenzyl)-5-methyl salicylic acid, 3-($\alpha,\alpha$-dimethylbenzyl)-6-methyl salicylic acid, 3-($\alpha$-methylbenzyl)-5-($\alpha,\alpha$-dimethylbenzyl)salicylic acid, 3-($\alpha,\alpha$-dimethylbenzyl)-6-ethyl salicylic acid, 3-phenyl-5-($\alpha,\alpha$-dimethylbenzyl)salicylic acid, a carboxy-modified terpene phenol resin, a salicylic acid resin that is a reaction product of 3,5-bis($\alpha$-methylbenzyl)salicylic acid with benzyl chloride, and the like.

The content (coating amount in the case of coating) of the electron-accepting compound in the color developer layer is preferably 0.1 $g/m^2$ to 30 $g/m^2$ in terms of dry mass. In the case where the electron-accepting compound is an inorganic compound, the content thereof is more preferably 3 $g/m^2$ to 20 $g/m^2$ and more preferably 5 $g/m^2$ to 15 $g/m^2$ in terms of dry mass. In the case where the electron-accepting compound is an organic compound, the content thereof is more preferably 0.1 $g/m^2$ to 5 $g/m^2$ and more preferably 0.2 $g/m^2$ to 3 $g/m^2$ in terms of dry mass.

The color developer layer can be formed by preparing a color developer layer-forming preparation liquid and forming a film using the preparation liquid. The color developer layer may be formed, for example, by applying a color developer layer-forming preparation liquid on a support by a method such as coating and drying the applied preparation liquid.

The color developer layer-forming preparation liquid may be a dispersion liquid in which the electron-accepting compound is dispersed in water or the like.

In the case where the electron-accepting compound is an inorganic compound, the dispersion liquid in which the electron-accepting compound is dispersed can be prepared by mechanically dispersing the inorganic compound in water. In the case where the electron-accepting compound is an organic compound, the dispersion liquid in which the electron-accepting compound is dispersed can be prepared by mechanically dispersing the organic compound in water or by dissolving the organic compound in an organic solvent.

For details thereof, reference can be made to the method described in JP1996-207435A (JP-H08-207435A).

The obtained dispersion liquid of the electron-accepting compound may be used as it is as a color developer layer-forming preparation liquid (for example, a coating liquid) for forming a color developer layer containing an electron-accepting compound.

(Other Components)

The color developer layer may contain additives such as a binder, a pigment, a fluorescent whitening agent, an antifoaming agent, a penetrating agent, and a preservative, in addition to the above-described electron-accepting compound.

Examples of the binder include synthetic or natural high-molecular weight materials such as styrene-butadiene copolymer latex, vinyl acetate-based latex, acrylic acid ester-based latex, polyvinyl alcohol, polyacrylic acid, maleic anhydride-styrene-copolymer, starch, casein, gum arabic, gelatin, carboxymethylcellulose, and methylcellulose.

Examples of the pigment include kaolin, calcined kaolin, kaolin aggregate, heavy calcium carbonate, light calcium carbonate in various forms (such as rice grain-like, horn-like, spindle-like, bur-like, sphere-like, aragonite-based column-like, or amorphous), talc, and rutile or anatase titanium dioxide.

In the case of forming a color developer layer by applying a color developer layer-forming preparation liquid, coating can be carried out by a known coating method, and the same coating method as in the case of forming the above-mentioned color forming layer can be applied.

EXAMPLES

Hereinafter, the present invention will be described in more detail with reference to Examples. The present invention is not limited to the following Examples unless departing from the spirit thereof. Unless otherwise specified, "%" and "parts" are on a mass basis.

Example 1

—Preparation of Electron-Donating Colorless Dye Precursor-Encapsulating Microcapsule Liquid (A)—

20 parts of the following compound (A) which is an electron-donating colorless dye precursor was dissolved in 57 parts of linear alkylbenzene (grade alkene L, manufactured by JX Energy Co., Ltd.) to obtain a solution A. Next, 0.2 parts of N,N,N',N'-tetrakis(2-hydroxypropyl)ethylenediamine (ADEKA POLYETHER EDP-300, manufactured by Adeka Corporation) dissolved in 15 parts of synthetic isoparaffin (IP Solvent 1620, manufactured by Idemitsu Kosan Co., Ltd.) and 1.2 parts of ethyl acetate were added to the solution A under stirring to obtain a solution B. Further, 1.2 parts of a trimethylolpropane adduct of tolylene diisocyanate (BURNOCK D-750, manufactured by DIC Corporation) dissolved in 3 parts of ethyl acetate were added to the solution B under stirring to obtain a solution C. Then, the solution C was added to a solution of 9 parts of polyvinyl alcohol (PVA-205, manufactured by Kuraray Co., Ltd.) dissolved in 140 parts of water, followed by emulsification dispersion. 340 parts of water were added to the emulsion after the emulsification dispersion, and the mixture was warmed to 70° C. with stirring, stirred for 1 hour and then cooled. Water was further added to adjust the concentration to obtain an electron-donating colorless dye precursor-encapsulating microcapsule liquid (A) having a solid content concentration of 19.6%.

Compound (A)

The median diameter (D50A) of the electron-donating colorless dye precursor-encapsulating microcapsule (A) as a volume standard was 30 µm. The number average wall thickness was 0.054 µm, and $\delta^A/D50A$ was $1.8\times10^{-3}$.

The median diameter (D50A) was calculated by applying the microcapsule liquid on a polyethylene terephthalate (PET) sheet (COSMOSHINE (registered trademark) A4300, manufactured by Toyobo Co., Ltd.) with an easy adhesion layer as a support and drying the applied microcapsule liquid, and then photographing the surface of the resulting coating film with an optical microscope at a magnification of 150× and measuring the sizes of all the microcapsules in the range of 2 cm×2 cm. In addition, the number average wall thickness was calculated by preparing a cross-sectional slice of the coating film, selecting 5 microcapsules from the cross section, determining the thickness (µm) of each capsule wall by a scanning electron microscope (SEM), and averaging the obtained values.

—Preparation of Electron-Donating Colorless Dye Precursor Non-Encapsulating Microcapsule Liquid (B)—

0.4 parts of N,N,N',N'-tetrakis(2-hydroxypropyl)ethylenediamine (ADEKA POLYETHER EDP-300, manufactured by Adeka Corporation) dissolved in 15 parts of synthetic isoparaffin (IP Solvent 1620, manufactured by Idemitsu Kosan Co., Ltd.) and 3 parts of ethyl acetate were added to 78 parts of 1-phenyl-1-xylylethane (Hisol SAS 296, manufactured by Nippon Oil Corporation) under stirring to obtain a solution D. Further, 3 parts of a trimethylolpropane adduct of tolylene diisocyanate (BURNOCK D-750, manufactured by DIC Corporation) dissolved in 7 parts of ethyl acetate were added to the solution D under stirring to obtain a solution E. Then, the solution E was added to a solution of 69 parts of polyvinyl alcohol (PVA-205, manufactured by Kuraray Co., Ltd.) dissolved in 140 parts of water, followed by emulsification dispersion. 340 parts of water were added to the emulsion after the emulsification dispersion, and the mixture was warmed to 70° C. with stirring, stirred for 1 hour and then cooled. Water was further added to adjust the concentration to obtain an electron-donating colorless dye precursor non-encapsulating microcapsule liquid (B) having a solid content concentration of 19.6%.

The median diameter (D50B) of the electron-donating colorless dye precursor non-encapsulating microcapsule (B) as a volume standard was 55 µm. The number average wall thickness was 0.24 µm, and $\delta^B/D50B$ was $4.3\times10^{-3}$. The median diameter (D50B) and the number average wall thickness were calculated by the same method as in D50A described above.

—Preparation of Dye Precursor Sheet (1)—

18 parts of the electron-donating colorless dye precursor-encapsulating microcapsule liquid (A) obtained above, 2 parts of the electron-donating colorless dye precursor non-encapsulating microcapsule liquid (B) obtained above, 63 parts of water, 1.8 parts of colloidal silica (SNOWTEX (registered trademark) 30, manufactured by Nissan Chemical Industries, Ltd.), 1.8 parts of a 10% aqueous solution of carboxymethyl cellulose Na (CELOGEN 5A, manufactured by DKS Co., Ltd.), 30 parts of a 1% aqueous solution of carboxymethyl cellulose Na (CELOGEN EP, manufactured by DKS Co., Ltd.), 0.3 parts of a 15% aqueous solution of sodium alkylbenzene sulfonate (NEOGEN T, manufactured by DKS Co., Ltd.), and 0.8 parts of a 1% aqueous solution of NOIGEN LP 70 (manufactured by DKS Co., Ltd.) were mixed and stirred for 2 hours to obtain a material composition for pressure measurement (1).

The material composition for pressure measurement (1) thus obtained was applied by a bar coater on a polyethylene terephthalate (PET) sheet (COSMOSHINE (registered trademark) A4300, manufactured by Toyobo Co., Ltd.) with easy adhesion layer having a thickness of 75 µm so that the mass after drying was 2.8 g/m² and then dried to form a color forming layer to prepare a dye precursor sheet (1) which is a material for pressure measurement.

In the above, the volume standard median diameter (D50X) of all particles in the material composition for pressure measurement (1) was 33 µm. The CV value (%=standard deviation/average particle diameter×100) of the particle size distribution of all particles in the material composition for pressure measurement (1) was 51%.

The median diameter, the average particle diameter, and the standard deviation were calculated by photographing the surface of the color forming layer, which is the coated surface of the prepared dye precursor sheet (1), with an optical microscope at a magnification of 150× and measuring the sizes of all the microcapsules in the range of 2 cm×2 cm.

—Preparation of Color Developer Sheet (1)—

10 parts of zinc 3,5-di-α-methylbenzylsalicylate which is an electron-accepting compound, 100 parts of calcium carbonate, 1 part of sodium hexametaphosphate, and 200 parts of water were dispersed using a sand grinder so that the average particle diameter of all particles was 2 μm to prepare a dispersion liquid. Subsequently, 100 parts of a 10% aqueous solution of polyvinyl alcohol (PVA-203, manufactured by Kuraray Co., Ltd.), 10 parts of styrene-butadiene latex as a solid content, and 450 parts of water were added to the prepared dispersion liquid to prepare a coating liquid containing an electron-accepting compound (color developer-containing preparation liquid).

The coating liquid containing an electron-accepting compound was applied on a polyethylene terephthalate (PET) sheet having a thickness of 75 μm so that the coating amount of the solid content was 4.0 g/m$^2$, and then dried to form a color developer layer to obtain a color developer sheet (1) which is a color developing material.

As described above, a two-sheet type material set for pressure measurement including the dye precursor sheet (1) and the color developer sheet (1) was prepared.

Examples 2 to 50 and Comparative Examples 1 to 6

Two-sheet type material sets for pressure measurement including a dye precursor sheet and a color developer sheet were prepared in the same manner as in Example 1, except that the microcapsule liquid and the color forming layer in Example 1 were changed as shown in Tables 1 to 3.

—Evaluation—

The following measurements and evaluations were carried out using the material sets for pressure measurement prepared in Examples and Comparative Examples. The results of measurement and evaluation are shown in Tables 1 to 3 below.

(1) Density Difference (ΔD1) Before and after Pressurization of 0.01 MPa

The dye precursor sheet (1) and the color developer sheet (1) were each cut into a size of 5 cm×5 cm. The dye precursor sheet (1) and the color developer sheet (1) were superimposed with each other by bringing the surface of the color forming layer of the dye precursor sheet (1) into contact with the surface of the color developer layer of the color developer sheet (1). Both of the superimposed sheets were sandwiched between two glass plates with smooth surfaces, and the resulting structure was placed on a desk. A weight was placed on the glass plate which was pressurized at a pressure of 0.01 MPa to make color formation.

Thereafter, both of the superimposed sheets were peeled off, and the density (DA) of the color-formed portion formed on the color developer sheet (1) was measured using a densitometer RD-19 (manufactured by Gretag-Macbeth AG).

Apart from the above, the density (initial density; DB) was measured on a fresh color developer sheet (1) by the same method.

The density difference was obtained by subtracting the initial density DB from the density DA of the color-formed portion, and it was taken as the color forming density (ΔD). The results are shown in Tables 1 to 3 below.

(2) Density Difference (ΔD2) Due to Scratching

The dye precursor sheet (1) and the color developer sheet (1) were each cut into a size of 10 cm×15 cm. The color developer sheet (1) was superimposed on the color forming layer of the dye precursor sheet (1) by bringing the color forming layer of the dye precursor sheet (1) into contact with the color developer layer of the color developer sheet (1). The color forming layer was repeatedly scratched twenty times against the color developer layer of the color developer sheet (1) while being superimposed therebetween. The density difference (ΔD2) was obtained by subtracting the initial density before scratching from the color forming density after scratching. The results are shown in Tables 1 to 3 below.

(3) Density Gradation of Color Formation (Gradation Property)

Using the material set for pressure measurement, the density of the color-formed portion developed at a pressure of 0.01 MPa, 0.02 MPa, 0.03 MPa, 0.04 MPa, and 0.05 MPa was measured in the same manner as in the measurement of "DA" in the case of obtaining "ΔD1". Evaluation was carried out according to the following evaluation standards. The evaluation results are shown in Tables 1 to 3 below.

<Evaluation Standards>

5: The density at 0.05 MPa is high, and the density change is linear.

4: The density at 0.05 MPa is high, but there is a slight inflection point in the density change and there is no practical problem.

3: The density at 0.05 MPa is low or the density change is saturated.

2: The density at 0.05 MPa is low or the density change is saturated, and there is a concern that practical problems may arise.

1: The density at 0.05 MPa is close to zero or there is no density change, and it cannot be used practically.

(4) Uneven Coating

The surface of the color forming layer which is the coated surface of the dye precursor sheet (1) was visually observed and evaluated according to the following evaluation standards. The evaluation results are shown in Tables 1 to 3 below.

<Evaluation Standards>

5: There is no occurrence of contrasting density unevenness and defects.

4: There are slight contrasting density unevenness and defects, but there is no practical problem.

3: There is obvious contrasting density unevenness or defects.

2: There is obvious contrasting density unevenness or defects and there is a concern that practical problems may arise.

1: There are too many contrasting density unevenness and defects, and it cannot be used practically.

(5) Color Forming Graininess

The dye precursor sheet (1) and the color developer sheet (1) were each cut into a size of 5 cm×5 cm. The dye precursor sheet (1) and the color developer sheet (1) were superimposed with each other by bringing the surface of the color forming layer of the dye precursor sheet (1) into contact with the surface of the color developer layer of the color developer sheet (1). Both of the superimposed sheets were sandwiched between two glass plates with smooth surfaces, and the resulting structure was placed on a desk. A weight was placed on the glass plate which was pressurized at a pressure of 0.03 MPa to make color formation. Thereafter, both of the superimposed sheets were peeled off, and the color-formed surface state of the color-formed color developer sheet (1) was visually observed and evaluated according to the following evaluation standards. The evaluation results are shown in Tables 1 to 3.

<Evaluation Standards>

3: There is very small graininess on the color-formed surface.

2: There is some graininess on the color-formed surface, but there is no practical problem.

1: The graininess on the color-formed surface is obviously large.

TABLE 1

| | Microcapsule A | | | Microcapsule B | | | D50X of particles in color forming layer [μm] | CV value of particles in color forming layer [%] | Microcapsule A1 of color forming layer $\delta^{A1}/D50A$ *2 |
|---|---|---|---|---|---|---|---|---|---|
| | A1 D50A1 [μm] | A2 D50A2 [μm] | Mixing ratio of A1 and A2 A1/A2 | D50B [μm] | Dye content [% by mass] | (A1 + A2)/ B ratio *1 | | | |
| Example 1 | 30 | — | — | 55 | 0% | 100/30 | 33 | 51% | $1.8 \times 10^{-3}$ |
| Example 2 | 30 | — | — | 55 | 0.5% | 100/30 | 33 | 51% | $1.8 \times 10^{-3}$ |
| Example 3 | 30 | — | — | 55 | 1.8% | 100/30 | 33 | 51% | $1.8 \times 10^{-3}$ |
| Example 4 | 30 | — | — | 55 | 2.9% | 100/30 | 33 | 51% | $1.8 \times 10^{-3}$ |
| Example 5 | 30 | — | — | 55 | 4.8% | 100/30 | 33 | 51% | $1.8 \times 10^{-3}$ |
| Example 6 | 45 | — | — | 55 | 0% | 100/30 | 39 | 32% | $1.8 \times 10^{-3}$ |
| Example 7 | 38 | — | — | 55 | 0% | 100/30 | 39 | 38% | $1.8 \times 10^{-3}$ |
| Example 8 | 26 | — | — | 55 | 0% | 100/30 | 29 | 91% | $1.8 \times 10^{-3}$ |
| Example 9 | 12 | — | — | 55 | 0% | 100/30 | 18 | 145% | $1.8 \times 10^{-3}$ |
| Example 10 | 9 | — | — | 55 | 0% | 100/30 | 13 | 151% | $1.8 \times 10^{-3}$ |
| Example 11 | 30 | — | — | 42 | 0% | 100/30 | 32 | 34% | $1.8 \times 10^{-3}$ |
| Example 12 | 30 | — | — | 72 | 0% | 100/30 | 35 | 63% | $1.8 \times 10^{-3}$ |
| Example 13 | 30 | — | — | 105 | 0% | 100/30 | 40 | 102% | $1.8 \times 10^{-3}$ |
| Example 14 | 30 | — | — | 135 | 0% | 100/30 | 48 | 120% | $1.8 \times 10^{-3}$ |
| Example 15 | 30 | — | — | 153 | 0% | 100/30 | 81 | 162% | $1.8 \times 10^{-3}$ |
| Example 16 | 30 | — | — | 55 | 0% | 100/60 | 35 | 60% | $1.8 \times 10^{-3}$ |
| Example 17 | 30 | — | — | 55 | 0% | 100/48 | 35 | 55% | $1.8 \times 10^{-3}$ |
| Example 18 | 30 | — | — | 55 | 0% | 100/20 | 31 | 45% | $1.8 \times 10^{-3}$ |
| Example 19 | 30 | — | — | 55 | 0% | 100/6 | 31 | 37% | $1.8 \times 10^{-3}$ |
| Example 20 | 30 | — | — | 55 | 0% | 100/2 | 30 | 32% | $1.8 \times 10^{-3}$ |

| | Microcapsule A2 of color forming layer $\delta^{A2}/D50A$ *2 | Microcapsule B of color forming layer $\delta^{B}/D50B$ *2 | Total content of microcapsules A1 + A2 + B [% by mass] | Evaluation | | | | |
|---|---|---|---|---|---|---|---|---|
| | | | | Density difference ΔD1 at pressurization of 0.01 MPa | Density difference ΔD2 due to rubbing | Gradation of color formation | Uneven coating | Color forming graininess |
| Example 1 | — | $4.3 \times 10^{-3}$ | 85% | 0.12 | 0.00 | 4 | 5 | 2 |
| Example 2 | — | $4.3 \times 10^{-3}$ | 85% | 0.12 | 0.00 | 4 | 5 | 2 |
| Example 3 | — | $4.3 \times 10^{-3}$ | 85% | 0.12 | 0.01 | 4 | 5 | 2 |
| Example 4 | — | $4.3 \times 10^{-3}$ | 85% | 0.12 | 0.01 | 4 | 5 | 2 |
| Example 5 | — | $4.3 \times 10^{-3}$ | 85% | 0.12 | 0.02 | 4 | 5 | 2 |
| Example 6 | — | $4.3 \times 10^{-3}$ | 85% | 0.13 | 0.02 | 3 | 5 | 2 |
| Example 7 | — | $4.3 \times 10^{-3}$ | 85% | 0.13 | 0.00 | 3 | 5 | 3 |
| Example 8 | — | $4.3 \times 10^{-3}$ | 85% | 0.10 | 0.00 | 4 | 4 | 3 |
| Example 9 | — | $4.3 \times 10^{-3}$ | 85% | 0.08 | 0.00 | 3 | 3 | 3 |
| Example 10 | — | $4.3 \times 10^{-3}$ | 85% | 0.02 | 0.00 | 3 | 3 | 3 |
| Example 11 | — | $4.3 \times 10^{-3}$ | 85% | 0.12 | 0.02 | 4 | 5 | 2 |
| Example 12 | — | $4.3 \times 10^{-3}$ | 85% | 0.12 | 0.00 | 4 | 5 | 2 |
| Example 13 | — | $4.3 \times 10^{-3}$ | 85% | 0.12 | 0.00 | 4 | 4 | 2 |
| Example 14 | — | $4.3 \times 10^{-3}$ | 85% | 0.12 | 0.00 | 4 | 3 | 2 |
| Example 15 | — | $4.3 \times 10^{-3}$ | 85% | 0.15 | 0.00 | 3 | 3 | 2 |
| Example 16 | — | $4.3 \times 10^{-3}$ | 85% | 0.02 | 0.00 | 4 | 5 | 2 |
| Example 17 | — | $4.3 \times 10^{-3}$ | 85% | 0.05 | 0.00 | 4 | 5 | 2 |
| Example 18 | — | $4.3 \times 10^{-3}$ | 85% | 0.12 | 0.00 | 4 | 5 | 2 |
| Example 19 | — | $4.3 \times 10^{-3}$ | 85% | 0.12 | 0.01 | 4 | 5 | 2 |
| Example 20 | — | $4.3 \times 10^{-3}$ | 85% | 0.12 | 0.02 | 4 | 5 | 2 |

*1 mass ratio of content of microcapsules A (total of A1 + A2) to content of microcapsules B.

*2 $\delta^{A1}$ and $\delta^{A2}$ represent a number average wall thickness of microcapsule A, and $\delta^{B}$ represents a number average wall thickness of microcapsule B.

D50A1 and D50A2 represent a volume standard median diameter of microcapsules A1 and A2, and D50B represents a volume standard median diameter of microcapsule B.

TABLE 2

| | Microcapsule A | | | Microcapsule B | | | D50X of particles in color forming layer [μm] | CV value of particles in color forming layer [%] | Microcapsule A1 of color forming layer $\delta^{A1}$/D50A *2 |
|---|---|---|---|---|---|---|---|---|---|
| | A1 D50A1 [μm] | A2 D50A2 [μm] | Mixing ratio of A1 and A2 A1/A2 | D50B [μm] | Dye content [% by mass] | (A1 + A2)/ B ratio *1 | | | |
| Example 21 | 30 | — | — | 55 | 0% | 100/30 | 33 | 51% | $0.9 \times 10^{-3}$ |
| Example 22 | 30 | — | — | 55 | 0% | 100/30 | 33 | 51% | $1.4 \times 10^{-3}$ |
| Example 23 | 30 | — | — | 55 | 0% | 100/30 | 33 | 51% | $2.4 \times 10^{-3}$ |
| Example 24 | 30 | — | — | 55 | 0% | 100/30 | 33 | 51% | $3.3 \times 10^{-3}$ |
| Example 25 | 30 | — | — | 55 | 0% | 100/30 | 33 | 51% | $4.3 \times 10^{-3}$ |
| Example 26 | 30 | — | — | 55 | 0% | 100/30 | 33 | 51% | $1.8 \times 10^{-3}$ |
| Example 27 | 30 | — | — | 55 | 0% | 100/30 | 33 | 51% | $1.8 \times 10^{-3}$ |
| Example 28 | 30 | — | — | 55 | 0% | 100/30 | 33 | 51% | $1.8 \times 10^{-3}$ |
| Example 29 | 30 | — | — | 55 | 0% | 100/30 | 33 | 51% | $1.8 \times 10^{-3}$ |
| Example 30 | 30 | — | — | 55 | 0% | 100/30 | 33 | 51% | $1.8 \times 10^{-3}$ |
| Example 31 | 30 | — | — | 55 | 0% | 100/30 | 33 | 51% | $1.8 \times 10^{-3}$ |
| Example 32 | 30 | 14 | 100/54 | 55 | 0% | 100/30 | 30 | 54% | $1.8 \times 10^{-3}$ |
| Example 33 | 30 | 18 | 100/54 | 55 | 0% | 100/30 | 31 | 52% | $1.8 \times 10^{-3}$ |
| Example 34 | 30 | 18 | 100/54 | 55 | 0% | 100/30 | 31 | 52% | $1.8 \times 10^{-3}$ |
| Example 35 | 30 | 18 | 100/20 | 55 | 0% | 100/30 | 31 | 52% | $1.8 \times 10^{-3}$ |
| Example 36 | 30 | 18 | 100/100 | 55 | 0% | 100/30 | 31 | 52% | $1.8 \times 10^{-3}$ |
| Example 37 | 30 | 18 | 100/120 | 55 | 0% | 100/30 | 31 | 52% | $1.8 \times 10^{-3}$ |
| Example 38 | 30 | 18 | 100/140 | 55 | 0% | 100/30 | 31 | 53% | $1.8 \times 10^{-3}$ |
| Example 39 | 30 | 18 | 100/160 | 55 | 0% | 100/30 | 31 | 54% | $1.8 \times 10^{-3}$ |
| Example 40 | 30 | — | — | 55 | 0% | 100/30 | 33 | 51% | $1.8 \times 10^{-3}$ |

| | Microcapsule A2 of color forming layer $\delta^{A2}$/D50A *2 | Microcapsule B of color forming layer $\delta^{B}$/D50B *2 | Total content of microcapsules A1 + A2 + B [% by mass] | Evaluation | | | | |
|---|---|---|---|---|---|---|---|---|
| | | | | Density difference ΔD1 at pressurization of 0.01 MPa | Density difference ΔD2 due to rubbing | Gradation of color formation | Uneven coating | Color forming graininess |
| Example 21 | — | $4.3 \times 10^{-3}$ | 85% | 0.15 | 0.00 | 3 | 5 | 2 |
| Example 22 | — | $4.3 \times 10^{-3}$ | 85% | 0.12 | 0.00 | 4 | 5 | 2 |
| Example 23 | — | $4.3 \times 10^{-3}$ | 85% | 0.10 | 0.00 | 4 | 5 | 2 |
| Example 24 | — | $4.3 \times 10^{-3}$ | 85% | 0.05 | 0.00 | 4 | 5 | 2 |
| Example 25 | — | $4.3 \times 10^{-3}$ | 85% | 0.02 | 0.00 | 3 | 5 | 2 |
| Example 26 | — | $0.9 \times 10^{-3}$ | 85% | 0.13 | 0.03 | 4 | 5 | 2 |
| Example 27 | — | $1.8 \times 10^{-3}$ | 85% | 0.12 | 0.01 | 4 | 5 | 2 |
| Example 28 | — | $2.4 \times 10^{-3}$ | 85% | 0.12 | 0.01 | 4 | 5 | 2 |
| Example 29 | — | $5.5 \times 10^{-3}$ | 85% | 0.10 | 0.00 | 4 | 5 | 2 |
| Example 30 | — | $8.2 \times 10^{-3}$ | 85% | 0.05 | 0.00 | 4 | 5 | 2 |
| Example 31 | — | $16 \times 10^{-3}$ | 85% | 0.02 | 0.00 | 4 | 5 | 2 |
| Example 32 | $3.3 \times 10^{-3}$ | $4.3 \times 10^{-3}$ | 85% | 0.12 | 0.00 | 5 | 5 | 2 |
| Example 33 | $3.3 \times 10^{-3}$ | $4.3 \times 10^{-3}$ | 85% | 0.12 | 0.00 | 5 | 5 | 2 |
| Example 34 | $3.3 \times 10^{-3}$ | $1.8 \times 10^{-3}$ | 85% | 0.13 | 0.01 | 5 | 5 | 2 |
| Example 35 | $3.3 \times 10^{-3}$ | $4.3 \times 10^{-3}$ | 85% | 0.12 | 0.00 | 5 | 5 | 2 |
| Example 36 | $3.3 \times 10^{-3}$ | $4.3 \times 10^{-3}$ | 85% | 0.12 | 0.00 | 5 | 5 | 2 |
| Example 37 | $3.3 \times 10^{-3}$ | $4.3 \times 10^{-3}$ | 85% | 0.11 | 0.00 | 5 | 5 | 2 |
| Example 38 | $3.3 \times 10^{-3}$ | $4.3 \times 10^{-3}$ | 85% | 0.10 | 0.00 | 5 | 5 | 2 |
| Example 39 | $3.3 \times 10^{-3}$ | $4.3 \times 10^{-3}$ | 85% | 0.09 | 0.00 | 4 | 5 | 2 |
| Example 40 | — | $4.3 \times 10^{-3}$ | 79% | 0.02 | 0.00 | 4 | 5 | 2 |

*1 mass ratio of content of microcapsules A (total of A1 + A2) to content of microcapsules B.
*2 $\delta^{A1}$ and $\delta^{A2}$ represent a number average wall thickness of microcapsule A, and $\delta^{B}$ represents a number average wall thickness of microcapsule B.
D50A1 and D50A2 represent a volume standard median diameter of microcapsules A1 and A2, and D50B represents a volume standard median diameter of microcapsule B.

TABLE 3

| | Microcapsule A | | | Microcapsule B | | | D50X of particles in color forming layer [μm] | CV value of particles in color forming layer [%] | Microcapsule A1 of color forming layer $\delta^{A1}$/D50A *2 |
|---|---|---|---|---|---|---|---|---|---|
| | A1 D50A1 [μm] | A2 D50A2 [μm] | Mixing ratio of A1 and A2 A1/A2 | D50B [μm] | Dye content [% by mass] | (A1 + A2)/ B ratio *1 | | | |
| Example 41 | 30 | — | — | 55 | 0% | 100/30 | 33 | 51% | $1.8 \times 10^{-3}$ |
| Example 42 | 30 | — | — | 55 | 0% | 100/30 | 33 | 51% | $1.8 \times 10^{-3}$ |
| Example 43 | 30 | — | — | 55 | 0% | 100/30 | 33 | 51% | $1.8 \times 10^{-3}$ |
| Example 44 | 30 | — | — | 55 | 0% | 100/30 | 33 | 51% | $1.8 \times 10^{-3}$ |
| Example 45 | 28 | — | — | 55 | 0% | 100/30 | 33 | 51% | $1.8 \times 10^{-3}$ |
| Example 46 | 26 | — | — | 55 | 0% | 100/30 | 33 | 51% | $1.8 \times 10^{-3}$ |

TABLE 3-continued

| | | | | | | | | | |
|---|---|---|---|---|---|---|---|---|---|
| Example 47 | 30 | 18 | 100/54 | 55 | 0% | 100/30 | 31 | 52% | $1.8 \times 10^{-3}$ |
| Example 48 | 33 | 18 | 100/54 | 55 | 0% | 100/30 | 32 | 52% | $1.8 \times 10^{-3}$ |
| Example 49 | 33 | 18 | 100/54 | 55 | 0% | 100/30 | 32 | 52% | $1.8 \times 10^{-3}$ |
| Example 50 | 33 | 18 | 100/54 | 55 | 0% | 100/30 | 32 | 52% | $1.8 \times 10^{-3}$ |
| Comparative Example 1 | 30 | — | — | — | — | — | 30 | 32% | — |
| Comparative Example 2 | 12 | — | — | — | — | — | 12 | 30% | — |
| Comparative Example 3 | 38 | — | — | — | — | — | 38 | 34% | — |
| Comparative Example 4 | 38 | — | — | 55 | 5.5% | 100/30 | 38 | 51% | $1.8 \times 10^{-3}$ |
| Comparative Example 5 | 38 | — | — | 55 | 8.6% | 100/30 | 38 | 51% | $1.8 \times 10^{-3}$ |
| Comparative Example 6 | 55 | — | — | 38 | 0.0% | 100/30 | 52 | 50% | $1.8 \times 10^{-3}$ |

| | | | | Evaluation | | | | |
|---|---|---|---|---|---|---|---|---|
| | Microcapsule A2 of color forming layer $\delta^{42}$/D50A *2 | Microcapsule B of color forming layer $\delta^B$/D50B *2 | Total content of microcapsules A1 + A2 + B [% by mass] | Density difference ΔD1 at pressurization of 0.01 MPa | Density difference ΔD2 due to rubbing | Gradation of color formation | Uneven coating | Color forming graininess |
| Example 41 | — | $4.3 \times 10^{-3}$ | 82% | 0.08 | 0.00 | 4 | 5 | 2 |
| Example 42 | — | $4.3 \times 10^{-3}$ | 90% | 0.12 | 0.00 | 4 | 5 | 2 |
| Example 43 | — | $4.3 \times 10^{-3}$ | 95% | 0.15 | 0.00 | 4 | 5 | 2 |
| Example 44 | — | $4.3 \times 10^{-3}$ | 99% | 0.18 | 0.00 | 3 | 5 | 2 |
| Example 45 | — | $4.3 \times 10^{-3}$ | 95% | 0.13 | 0.00 | 4 | 5 | 3 |
| Example 46 | — | $4.3 \times 10^{-3}$ | 95% | 0.12 | 0.00 | 4 | 5 | 3 |
| Example 47 | $3.3 \times 10^{-3}$ | $4.3 \times 10^{-3}$ | 95% | 0.15 | 0.00 | 5 | 5 | 2 |
| Example 48 | $3.3 \times 10^{-3}$ | $4.3 \times 10^{-3}$ | 95% | 0.15 | 0.00 | 5 | 5 | 2 |
| Example 49 | $3.3 \times 10^{-3}$ | $1.8 \times 10^{-3}$ | 85% | 0.13 | 0.01 | 5 | 5 | 2 |
| Example 50 | $3.3 \times 10^{-3}$ | $1.8 \times 10^{-3}$ | 95% | 0.15 | 0.01 | 5 | 5 | 2 |
| Comparative Example 1 | — | — | — | 0.12 | 0.05 | 4 | 5 | 2 |
| Comparative Example 2 | — | — | — | 0.00 | 0.00 | 2 | 5 | 3 |
| Comparative Example 3 | — | — | — | 0.15 | 0.08 | 2 | 5 | 2 |
| Comparative Example 4 | $1.8 \times 10^{-3}$ | $4.3 \times 10^{-3}$ | 85% | 0.15 | 0.05 | 4 | 5 | 2 |
| Comparative Example 5 | $1.8 \times 10^{-3}$ | $4.3 \times 10^{-3}$ | 85% | 0.15 | 0.12 | 4 | 5 | 2 |
| Comparative Example 6 | $1.8 \times 10^{-3}$ | $4.3 \times 10^{-3}$ | 85% | 0.15 | 0.13 | 2 | 5 | 1 |

*1 mass ratio of content of microcapsules A (total of A1 + A2) to content of microcapsules B.
*2 $\delta^{41}$ and $\delta^{42}$ represent a number average wall thickness of microcapsule A, and $\delta^B$ represents a number average wall thickness of microcapsule B.
D50A1 and D50A2 represent a volume standard median diameter of microcapsules A1 and A2, and D50B represents a volume standard median diameter of microcapsule B.

As shown in Tables 1 to 3, in Examples, color forming densities of 0.02 or more, which can be visually recognized or readable, were obtained even with a minute pressure of less than 0.05 MPa, whereas color formation due to scratching was suppressed to 0.02 or less.

On the other hand, in Comparative Examples 1 and 3 which do not contain the electron-donating colorless dye precursor non-encapsulating microcapsule liquid (B) containing no color-forming component, color developability with a minute pressure could be obtained, but color formation due to scratching was large and the gradation property of color formation was inferior in each case. Further, in Comparative Example 2 which does not contain the electron-donating colorless dye precursor non-encapsulating microcapsule liquid (B) containing no color-forming component, there was no color formation due to scratching since the capsule size was small, but the color developability at a minute pressure was also poor, and the gradation property of color formation was inferior.

In Comparative Examples 4 and 5, color formation due to scratching was not suppressed since two types of microcapsules encapsulating a color-forming component were contained and the electron-donating colorless dye precursor non-encapsulating microcapsules containing no color-forming component were not contained.

In Comparative Example 6, the function as a sacrificial material was poor and color formation due to scratching could not be suppressed as well since D50B of the electron-donating colorless dye precursor non-encapsulating microcapsules was equal to or smaller than D50A of the electron-donating colorless dye precursor-encapsulating microcapsules although the electron-donating colorless dye precursor non-encapsulating microcapsules containing no color-forming component were contained.

The disclosures of JP 2016-191783 filed on Sep. 29, 2016 and JP 2017-110220 filed on Jun. 2, 2017 are incorporated herein by reference in their entirety.

All documents, patent applications, and technical standards described in the present specification are incorporated herein by reference to the same extent as the case where each individual document, patent application, and technical standard were specifically and individually indicated to be incorporated by reference.

What is claimed is:

1. A material for pressure measurement, comprising:
a color forming layer that contains microcapsules A encapsulating an electron-donating colorless dye precursor; and microcapsules B not encapsulating an electron-donating colorless dye precursor, wherein, in a case of color formation, a density exceeding 0.02 is obtained as a density difference $\Delta D1$ obtained by subtracting a density before applying a pressure from a density after color formation by applying a pressure at 0.01 MPa; and a volume standard median diameter D50A of the microcapsules A and a volume standard median diameter D50B of the microcapsules B satisfy Equation 1:

$$D50A < D50B \qquad \text{Equation 1.}$$

2. The material for pressure measurement according to claim 1, wherein the median diameter D50A satisfies Equation 2 and the median diameter D50B satisfies Equation 3:

$$10\ \mu m < D50A < 40\ \mu m \qquad \text{Equation 2}$$

$$40\ \mu m < D50B < 150\ \mu m \qquad \text{Equation 3.}$$

3. The material for pressure measurement according to claim 2, wherein a standard median diameter D50X of all particles contained in the color forming layer satisfies Equation 4, a coefficient of variation of particle size distribution of all particles contained in the color forming layer is 35% to 150%, in a case of color formation, a density exceeding 0.02 is obtained as a density difference $\Delta D1$ obtained by subtracting a density before applying a pressure from a density after color formation by applying a pressure at 0.01 MPa, and a density difference $\Delta D2$, which is obtained in such a manner that a color developing material having a color developer layer containing an electron-accepting compound is superimposed on the color forming layer so that the color developer layer having the same area as that of the color forming layer is brought into contact with the color forming layer, and a color forming density before scratching is subtracted from a color forming density after repeatedly scratching the color forming layer twenty times against the color developing material, is 0.02 or less:

$$15\ \mu m < D50X < 50\ \mu m \qquad \text{Equation 4.}$$

4. The material for pressure measurement according to claim 3, wherein a ratio of a number average wall thickness $\delta^A$ of the microcapsule A to the volume standard median diameter D50A of the microcapsule A is $1.0\times10^{-3}$ to $4.0\times10^{-3}$, and a ratio of a number average wall thickness $\delta^B$ of the microcapsule B to the volume standard median diameter D50B of the microcapsule B is $1.0\times10^{-3}$ to $1.5\times10^{-2}$, two types of microcapsules having different volume standard median diameters D50A are contained as the microcapsules A, at least two types of microcapsules including microcapsules A1 having a median diameter of D50A1 and microcapsules A2 having a median diameter of D50A2 are contained as the microcapsules A, and in a case where the relationship of D50A1>D50A2 is satisfied, a ratio of the content of the microcapsules A1 to the content of the microcapsules A2 is 100/1 to 100/150 in terms of mass, the content of the microcapsules A and the microcapsules B in the color forming layer is 80% by mass to 97% by mass with respect to the total solid content of the color forming layer, and the material for pressure measurement comprising at least a support, and an easy adhesion layer and the color forming layer arranged in order from the support side.

5. A material set for pressure measurement, comprising:
the material for pressure measurement according to claim 4; and
a color developing material having a color developer layer containing an electron-accepting compound.

6. The material for pressure measurement according to claim 1, wherein a volume standard median diameter D50X of all particles contained in the color forming layer satisfies Equation 4:

$$15\ \mu m < D50X < 50\ \mu m \qquad \text{Equation 4.}$$

7. The material for pressure measurement according to claim 1, wherein a coefficient of variation of particle size distribution of all particles contained in the color forming layer is 35% to 150%.

8. The material for pressure measurement according to claim 1, wherein a density difference $\Delta D2$, which is obtained in such a manner that a color developing material having a color developer layer containing an electron-accepting compound is superimposed on the color forming layer so that the color developer layer having the same area as that of the color forming layer is brought into contact with the color forming layer, and a color forming density before scratching is subtracted from a color forming density after repeatedly scratching the color forming layer twenty times against the color developing material, is 0.02 or less.

9. The material for pressure measurement according to claim 1, wherein a ratio of a number average wall thickness $\delta^A$ of the microcapsule A to the volume standard median diameter D50A of the microcapsule A is $1.0\times10^{-3}$ to $4.0\times10^{-3}$, and a ratio of a number average wall thickness $\delta^B$ of the microcapsule B to the volume standard median diameter D50B of the microcapsule B is $1.0\times10^{-3}$ to $1.5\times10^{-2}$.

10. The material for pressure measurement according to claim 1, which comprises at least a support, and an easy adhesion layer and the color forming layer arranged in order from the support side.

11. The material for pressure measurement according to claim 1, wherein two types of microcapsules having different volume standard median diameters D50A are contained as the microcapsules A.

12. The material for pressure measurement according to claim 1,
wherein at least two types of microcapsules including microcapsules A1 having a median diameter of D50A1 and microcapsules A2 having a median diameter of D50A2 are contained as the microcapsules A, and
in a case where the relationship of D50A1>D50A2 is satisfied, a ratio of the content of the microcapsules A1 to the content of the microcapsules A2 is 100/1 to 100/150 in terms of mass.

13. The material for pressure measurement according to claim 1, wherein the content of the microcapsules A and the microcapsules B in the color forming layer is 80% by mass to 97% by mass with respect to the total solid content of the color forming layer.

14. A material set for pressure measurement, comprising:
the material for pressure measurement according to claim 1; and
a color developing material having a color developer layer containing an electron-accepting compound.

15. A material composition for pressure measurement, comprising:
microcapsules A encapsulating an electron-donating colorless dye precursor; and
microcapsules B not encapsulating an electron-donating colorless dye precursor, wherein, in a case of color formation, a density exceeding 0.02 is obtained as a density difference $\Delta D1$ obtained by subtracting a density before applying a pressure from a density after color formation by applying a pressure at 0.01 MPa, and a volume standard median diameter D50A of the microcapsules A and a volume standard median diameter D50B of the microcapsules B satisfy Equation 1:

$$D50A < D50B \qquad \text{Equation 1.}$$

16. The material composition for pressure measurement according to claim 15, wherein the median diameter D50A satisfies Equation 2, and the median diameter D50B satisfies Equation 3:

$$10\ \mu m < D50A < 40\ \mu m \qquad \text{Equation 2}$$

$$40\ \mu m < D50B < 150\ \mu m \qquad \text{Equation 3.}$$

17. The material composition for pressure measurement according to claim 15, wherein a ratio of the content of the microcapsules A to the content of the microcapsules B is 100/5 to 100/50 in terms of mass.

18. The material composition for pressure measurement according to claim 15, wherein a volume standard median diameter D50X of all particles contained in the composition satisfies Equation 4, and a coefficient of variation of particle size distribution of all particles contained in the composition is 35% to 150%:

$$15\ \mu m < D50X < 50\ \mu m \qquad \text{Equation 4.}$$

19. The material composition for pressure measurement according to claim 15, wherein two types of microcapsules having different volume standard median diameters D50A are contained as the microcapsules A.

* * * * *

UNITED STATES PATENT AND TRADEMARK OFFICE
CERTIFICATE OF CORRECTION

PATENT NO. : 11,230,130 B2
APPLICATION NO. : 16/364189
DATED : January 25, 2022
INVENTOR(S) : Satoshi Tanaka Page 1 of 1

It is certified that error appears in the above-identified patent and that said Letters Patent is hereby corrected as shown below:

On the Title Page

Item (30) should be corrected to read:
Jun 2, 2017 [JP] JP2017-110220
Sep. 29, 2016 [JP] JP2016-191783

Signed and Sealed this
Twelfth Day of April, 2022

Drew Hirshfeld
*Performing the Functions and Duties of the
Under Secretary of Commerce for Intellectual Property and
Director of the United States Patent and Trademark Office*